United States Patent
Kucharczyk et al.

(10) Patent No.: US 10,962,087 B2
(45) Date of Patent: Mar. 30, 2021

(54) TOOTHED BELT HAVING A WOVEN FABRIC LAYER AND METHOD FOR MAKING THE SAME

(71) Applicant: ContiTech Antriebssysteme GmbH, Hannover (DE)

(72) Inventors: Andre Kucharczyk, Guelden (DE); Hubert Goeser, Dannenberg (DE)

(73) Assignee: ContiTech Antriebssysteme GmbH, Hannover (DE)

( * ) Notice: Subject to any disclaimer, the term of this patent is extended or adjusted under 35 U.S.C. 154(b) by 428 days.

(21) Appl. No.: 16/093,090

(22) PCT Filed: Jan. 19, 2017

(86) PCT No.: PCT/EP2017/051023
§ 371 (c)(1),
(2) Date: Oct. 11, 2018

(87) PCT Pub. No.: WO2017/178123
PCT Pub. Date: Oct. 19, 2017

(65) Prior Publication Data
US 2019/0162269 A1    May 30, 2019

(30) Foreign Application Priority Data
Apr. 12, 2016   (DE) ............. 10 2016 206 029.5

(51) Int. Cl.
*F16G 1/10*    (2006.01)
*B29D 29/08*   (2006.01)
(Continued)

(52) U.S. Cl.
CPC ............. *F16G 1/10* (2013.01); *B29D 29/08* (2013.01); *F16G 1/28* (2013.01); *B29K 2075/00* (2013.01); *B29K 2105/0845* (2013.01)

(58) Field of Classification Search
CPC .................................. F16G 1/10; B29D 29/08
See application file for complete search history.

(56) References Cited

U.S. PATENT DOCUMENTS 5,066,344 A * 11/1991 Inami .................. F16G 1/06
156/138
8,262,523 B2 * 9/2012 Kanzow ............... F16G 5/20
474/268
(Continued)

FOREIGN PATENT DOCUMENTS

DE    102007062285 A1 * 6/2009 ............. F16G 1/28
DE    102017206844 A1 * 10/2018 ............ B29C 43/28
EP    0280175 A2    8/1988

OTHER PUBLICATIONS

Machine Translation DE102007062285 (Year: 2007).*
(Continued)

*Primary Examiner* — Matthew J Daniels
*Assistant Examiner* — Wayne K. Swier
(74) *Attorney, Agent, or Firm* — David L. Cate; Gregory Adams

(57) ABSTRACT

A toothed belt includes a toothed profile made of a base material and defining a toothed profile drive side and a far side facing away from the drive side. A woven ply has a thickness and is applied to the far side of the toothed profile. The woven ply has a first side in contact with the far side causing the base material to penetrate the woven ply at least partly at the first side thereof. The woven ply has a second side facing away from the first side. A coating of plastic on the second side causes the plastic to penetrate the woven ply at least partly at the second side. The base material and the plastic each penetrate the woven ply to an extent to cause the woven ply to be free of the base material and the plastic in an inner lying thickness region thereof.

2 Claims, 2 Drawing Sheets

(51) Int. Cl.
    *F16G 1/28*     (2006.01)
    *B29K 75/00*     (2006.01)
    *B29K 105/08*     (2006.01)

(56) References Cited

U.S. PATENT DOCUMENTS

| | | | | |
|---|---|---|---|---|
| 2003/0078125 A1* | 4/2003 | Knutson | ............... | F16G 1/10 |
| | | | | 474/260 |
| 2009/0199347 A1* | 8/2009 | Wood | ............... | F16G 1/10 |
| | | | | 8/115.6 |
| 2013/0225346 A1* | 8/2013 | Gibson | ............... | F16G 1/08 |
| | | | | 474/260 |
| 2014/0323257 A1* | 10/2014 | Gibson | ............... | F16G 5/20 |
| | | | | 474/261 |
| 2014/0378255 A1* | 12/2014 | Gibson | ............... | B29D 29/08 |
| | | | | 474/263 |
| 2015/0087456 A1* | 3/2015 | Baltes | ............... | F16G 5/08 |
| | | | | 474/266 |

OTHER PUBLICATIONS

Machine Translation DE102017206844 (Year: 2017).*
International Search Report dated Jun. 19, 2017 of international application PCT/EP2017/051023 on which this application is based.

\* cited by examiner

TOOTHED BELT HAVING A WOVEN FABRIC LAYER AND METHOD FOR MAKING THE SAME

CROSS REFERENCE TO RELATED APPLICATIONS

This application is the national stage of PCT/EP 2017/051023, filed Jan. 19, 2017, designating the United States and claiming priority from German patent application no. 10 2016 206 029.5, filed Apr. 12, 2016, the entire contents of which are incorporated herein by reference.

FIELD OF THE INVENTION

The invention relates to a toothed belt for use in belt drives, preferably a toothed belt made of polyurethane having at least one drive side provided with a tooth profile, the tooth profile of which has been provided with a woven ply on the outside. In a belt drive, the toothed belt intermeshes with toothed disks provided with a tooth profile complementary to the tooth profile of the belt. The invention further relates to a process for producing such a drive belt.

BACKGROUND OF THE INVENTION

The toothed polyurethane belts addressed here are produced by extrusion of the base material. During the extrusion, in a specific corresponding exit die, strengthening elements or tensile elements that generally take the form of cords are incorporated into the still-warm, relatively viscous material being extruded. These cords essentially absorb the tensile forces in the finished hardened toothed belt.

The resultant still-viscous polyurethane material together with the tensile elements, as base material of the toothed belt, is formed between a belt and a forming wheel provided with an outer tooth pattern with removal of heat to give the finished toothed belt, where the belt wraps around the forming wheel over a wrap angle of about 200° under pressure. In the cases in which the toothed belt has been provided with a weave coating on its toothed side, shortly before the precursor enters the wrapping arc of the forming wheel, a weave runs onto the forming wheel and is then indented into the shapingly toothed outline of the forming wheel together with the precursor. Weave coatings of this kind are known and are customary, for example, for reduction of wear and abatement of noise.

Typically, in the case of such toothed PU belts produced from extruded precursors as weave cover/weave ply on the toothed side, a weave having good elongation properties in longitudinal direction is used. In belt production, in the above-described forming of the teeth on the forming wheel, this weave is then stretched out by the high-viscosity PU melt and pressed into the tooth pattern. What can happen here in a disadvantageous manner is that the stretching in the deformation makes the weave correspondingly thinner, such that the weave structure can open up and there is occasional penetration/seeping of PU. What can also happen is that the teeth are not fully formed when the melt pressure is too low. Specifically in the case of teeth that are not fully formed or in the event of penetration of polyurethane, there is also failure to attain the load-bearing capacity of the teeth of the toothed belt which is required in operation.

SUMMARY OF THE INVENTION

It is an object of the invention to provide a toothed belt and a process for production thereof, in which the disadvantages of seeping of base material of the toothed belt are avoided and impeccable forming is enabled, such that the toothed belts no longer have the disadvantages known in the prior art.

The woven ply here has, on its outside remote from the tooth profile, a coating of polymer, preferably of polyethylene. This woven ply, in relation to its thickness, has firstly been penetrated at least partly on its side facing the tooth profile by base material of the toothed belt and at least partly on its outside by the polymer coating in such a way that the woven ply is free of penetration material in a thickness region on the inside in relation to its thickness.

Especially in combination with the fact that the woven ply has been penetrated on its outside by the polymer coating only up to a penetration depth of 5-50% of the ply thickness, i.e. of the weave thickness, it is possible to reliably avoid any movement or distortion of the weave structure and to maintain the original extensibility of the weave and the required load-bearing capacity of the teeth.

Production is advantageously by the process of the invention, in which
a) the base material of the toothed belt is first extruded,
b) during the extrusion of the corresponding exit die of the extruder strengthening elements or tensile elements are incorporated into the extruded material,
c) the resultant precursor is formed together with tensile elements between a forming wheel provided with the negative of the tooth pattern on its outer circumference and a belt that runs around the forming wheel with removal of heat to give the finished toothed belt, where the belt wraps around the forming wheel over a wrap angle of about 200° under pressure,
d) shortly before the precursor enters the wrapping arc of the forming wheel a woven ply runs onto the forming wheel and is then indented together with the precursor into the shapingly toothed outline of the forming wheel,
e) the woven ply, on its side facing the forming wheel, before running into the forming wheel, is provided with a coating of polymer, preferably polyethylene, such that the woven ply has been penetrated up to a penetration depth of 5-50% of the ply thickness (weave thickness) by the polymer coating,
f) the coated woven ply is then preformed such that it already has essentially the geometry of the toothed form of the forming wheel even before it runs into the forming wheel,
g) and then the woven ply preformed with the toothed form intermeshes with the forming wheel and is indented into the shapingly toothed outline of the forming wheel together with the precursor,
wherein the viscosity of the base material of the toothed belt that consists of thermoplastic polyurethane is adjusted such that the polymer-coated woven ply preformed with the toothed form is indented into the precursor such that the woven ply is not penetrated by polyurethane in a thickness region on the inside in relation to its thickness.

The preformed woven ply thus intermeshes synchronously with the forming wheel and is indented into the toothed outline of the forming wheel together with the precursor. In that case, it is thus only the base material that is deformed here, and it is no longer necessary for the woven ply as such to be indented into the teeth of the forming wheel by the pressure that arises in the base material.

It is thus of course also possible to adjust the penetration depth of the raw material into the woven ply much more precisely than in the case of the conventional processes. This supports the formation of the toothed belt in such a way that the woven ply is free of penetration material in a thickness region on the inside in relation to its thickness, i.e. is free of polyurethane, for instance, from the base material or raw material and also of the polyethylene from the coating, such that it becomes possible to configure the woven ply utilized for coating in such a way that the inner thickness region of the woven ply without penetration material is 5-50% of the ply thickness (weave thickness) and preferably makes up between 5% and 30% of the ply thickness.

The particular advantage of such a form of the toothed belt is that the specific construction of the weave reduces the surface tensions at the tooth flanks on interdigitation into the toothed disks. This reduces tooth wear and correspondingly increases the lifetime. One of the achievements by virtue of the novel weave and the internal thickness region thereof which is free of penetration material is that the outer coating (PE film) can move in a virtually force-free manner in relation to the inner belt tooth structure.

In a further advantageous form in relation to the extensibility of the toothed belt, the weave that forms the woven ply consists of warp and weft threads, the warp threads having been aligned parallel or essentially parallel to the longitudinal belt axis. Solely the arrangement of the longer warp threads in longitudinal toothed belt direction already results in better extensibility. This is advantageously further improved in that the warp threads have been textured or crimped.

In a further advantageous form, the weft threads have been alternatively or additively textured or have been crimped so as to permit elevated elongation of the warp threads. This means that it is thus possible in a simple manner to simply absorb/buffer cross-movements as well, as arise, for example, when toothed belts run against flanged wheels. The extensibility of the weave can also be generated via the weave type and not just via the texture of the yarns.

What is achieved by the inventive form of the woven ply is that the outer coating (PE film) can move in a virtually force-free manner relative to the inner belt tooth. The movement is via the stretching of the warp yarn structure.

When the tooth meshes into the toothed disk and when the belt runs around the toothed disk, there are generally small movements between the belt teeth and the disk teeth. In the case of corresponding forces, these movements generate high shear forces, which leads to significant abrasion at the tooth surface of the belt teeth. The woven ply of the invention buffers these movements away, i.e. compensates for them, in the free "unpenetrated weave interlayer".

The woven ply of the toothed belt of the invention thus has a weave that provides very good extension properties in circumferential belt direction by virtue of textured warp threads. This weave has been coated on one side with a PE film in such a way that this polymer penetrates into the weave surface. The penetration depth is adjusted such that between 5% and 50% is attained according to later stress.

Then this weave/laminate is preformed such that it takes on the geometry of the tooth pattern, although a majority of the texture of the warp threads is preserved.

In belt production, the coated woven ply is then fed to the forming wheel/forming drum such that the coated side faces the forming surface. In the process mentioned, the thermoplastic PU then lies on the uncoated side and likewise penetrates into the surface of the woven ply—on the effectively still-free side—as a result of pressure. The production operation is controlled here such that the weave is not completely filled with PU. Between the region filled with PE film and the region filled with PU, there is then between 5% and 50%, preferably between 5% and 30%, of unfilled weave.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
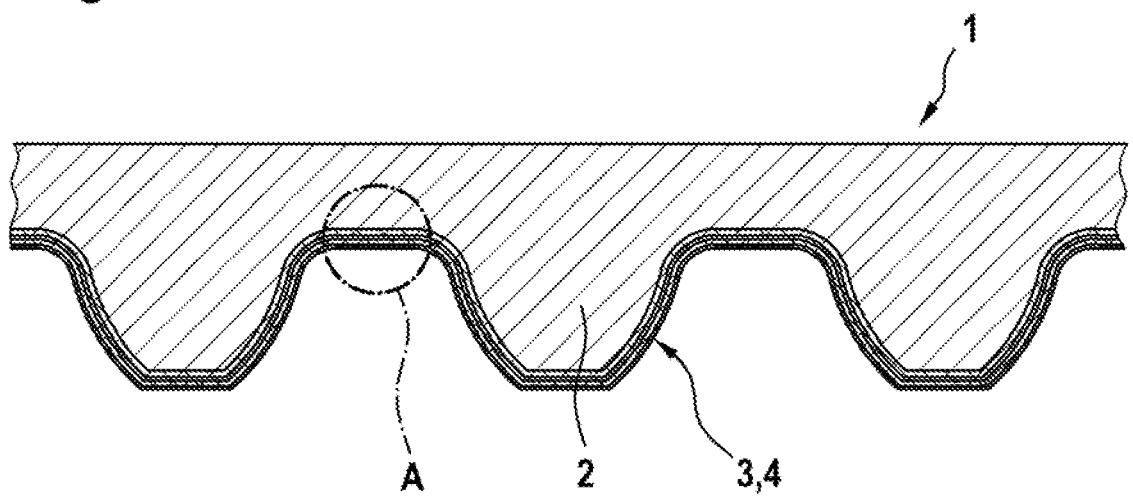
FIG. 1 shows part of a toothed belt of the invention.

FIG. 1 shows part of a toothed PU belt 1, the tooth profile 2 of which has been provided with a woven ply 3 on the outside. The woven ply 3 has, on its outside facing away from the tooth profile, a coating 4 of polyethylene, as becomes clear more particularly when viewed together with the enlargement of detail "A" from FIG. 1 in FIG. 2. The woven ply 3, in relation to its thickness 5, has firstly been at least partly penetrated on its side facing the tooth profile by base material of the toothed belt, while it has been at least partly penetrated on its outside by the polyethylene coating 4.

Figure 2:
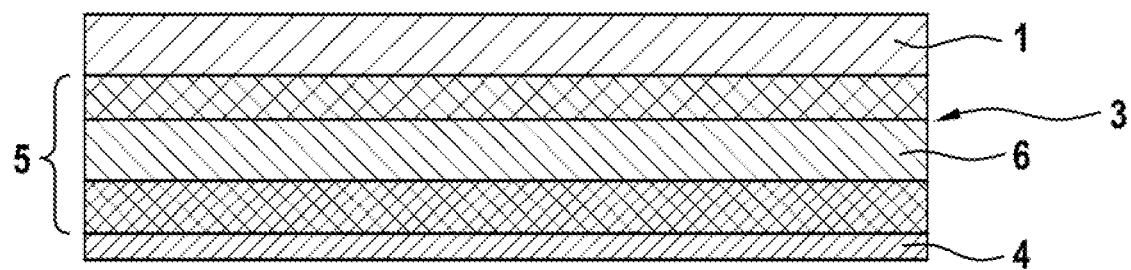
FIG. 2 shows a schematic diagram of the construction of the toothed belt of the invention with the tooth pattern in an enlargement of detail "A" from FIG. 1.

FIGS. 1 and 2 thus show, as schematic diagrams of the construction of the toothed belt of the invention, the configurations of the features of the present toothed belt, i.e. the manner in which the woven ply lies on the actual raw material of the toothed belt (PU) and has been provided in turn with an outer coating (PE).

The penetration depth of the polyethylene coating 4 into the woven ply 3 here is 37% of the ply thickness, i.e. of the weave thickness 5. The woven ply is free of penetration material in an internal thickness region 6, i.e. both free of polyethylene material and free of polyurethane base material of the toothed belt.

In the toothed belt of the invention, the woven ply is thus preformed at the early stage of production such that it already has the tooth profile and does not have to be stretched out and pressed into the tooth pattern again. In combination with this, seepage or penetration of the PU material in the shaping is avoided, and 100% formation of the teeth is achieved. By virtue of the specific construction of the woven ply, in operation/in the toothed belt drive under stress, the surface tensions at the tooth flanks are reduced on meshing into the toothed disks. This reduces tooth wear and correspondingly increases the lifetime.

Figure 3:
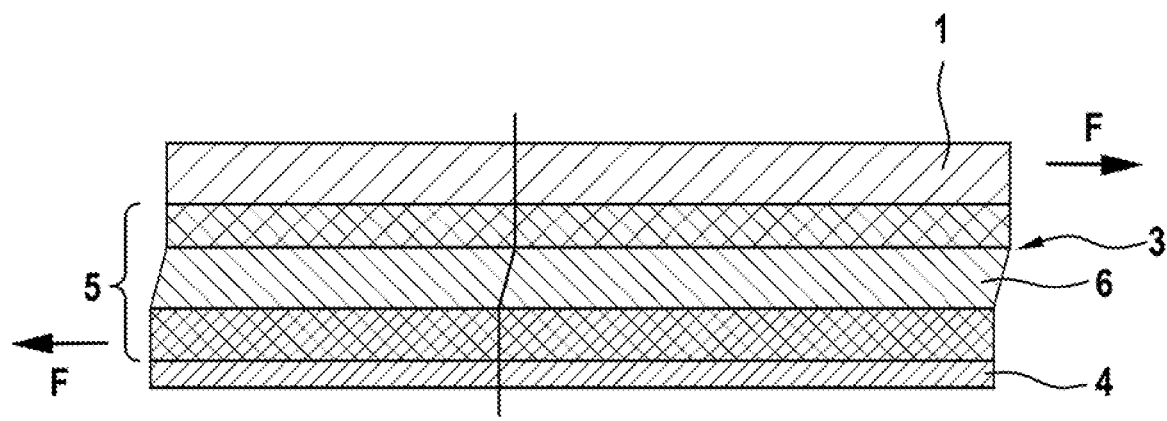
FIG. 3 shows an enlargement of detail "A" from FIG. 1 under shear force stress.

FIG. 3 shows this very clearly once again by the detail "A" from FIG. 1, namely that, under shear force stress, the outer coating, i.e. the PE film 4 here, can move in a virtually force-free manner in relation to the inner structure of the belt tooth. The particular advantage of such a form of the toothed belt 1 is that this specific construction of the weave with an unpenetrated thickness region 6 can reduce the surface tensions at the tooth flanks on interdigitation into the toothed disks. This reduces tooth wear and correspondingly increases the lifetime.

It is understood that the foregoing description is that of the preferred embodiments of the invention and that various changes and modifications may be made thereto without departing from the spirit and scope of the invention as defined in the appended claims.

REFERENCE NUMERALS

Part of the Description

1 Toothed belt
2 Tooth profile
3 Woven ply
4 Coating of the woven ply/polyethylene (PE) coating
5 Thickness of the woven ply
6 Inner unpenetrated thickness region

The invention claimed is:

1. A method for making a toothed belt from thermoplastic polyurethane, the toothed belt comprising: a toothed profile defining a toothed profile drive side and a far side facing away from said drive side; said toothed profile including a base material; a woven ply having a predetermined thickness and being applied to said far side of said toothed profile; said woven ply having a first side in contact with said far side causing said base material of said toothed profile to penetrate said woven ply at least partly at said first side thereof; said woven ply having a second side facing away from said first side; a coating of polymer on said second side of said woven ply causing said polymer to penetrate said woven ply at least partly at said second side; and, said base material and said polymer each penetrating said woven ply to an extent to cause said woven ply to be free of said base material and said polymer in an inner lying thickness region thereof with reference to said predetermined thickness; the method comprising the steps of:

a) first extruding the base material of the toothed belt;
b) during the extrusion of the corresponding exit die of the extruder, incorporating strengthening elements or tensile elements into the extruded material;
c) forming the resultant precursor together with tensile elements between a forming wheel provided with the negative of the tooth pattern on its outer circumference and a belt that runs around the forming wheel with removal of heat to yield the finished toothed belt, where the belt wraps around the forming wheel over a wrap angle of about 200° under pressure;
d) shortly before the precursor enters the wrapping arc of the forming wheel, running a woven ply onto the forming wheel and then indenting together with the precursor into the shapingly toothed outline of the forming wheel; wherein:
i) the woven ply, on its side facing the forming wheel, before running into the forming wheel, has been provided with a coating of polymer, preferably polyethylene, such that the woven ply has been penetrated up to a penetration depth of 5 to 50% of the ply thickness (weave thickness) by the polymer coating;
ii) the coated woven ply has then been preformed such that it already has essentially the geometry of the toothed form of the forming wheel even before it runs into the forming wheel;
e) intermeshing then the woven ply preformed with the toothed form on the forming wheel and indenting into the shapingly toothed outline of the forming wheel together with the precursor; and,
adjusting the viscosity of the base material of the toothed belt that includes thermoplastic polyurethane such that the polymer-coated woven ply preformed with the toothed form is indented into the precursor such that the woven ply is not penetrated by polyurethane in the inner lying thickness region.

2. The method of claim 1, wherein the coated woven ply is preformed such that a defined texture or crimping of the warp threads of the weave that forms the woven ply is conserved.